July 7, 1964
R. L. SMIRL
3,139,764
ANTI-SPIN DEVICE FOR TRANSMISSION MECHANISM
Filed March 21, 1961
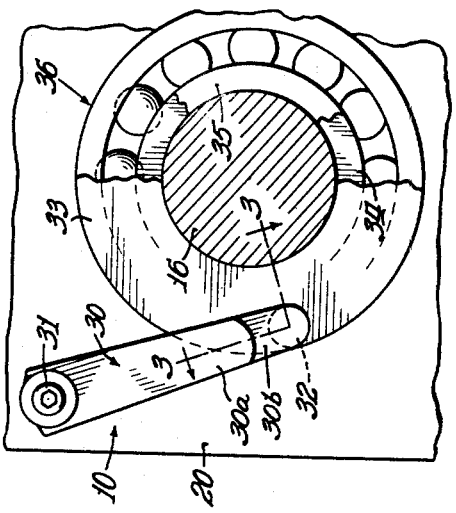
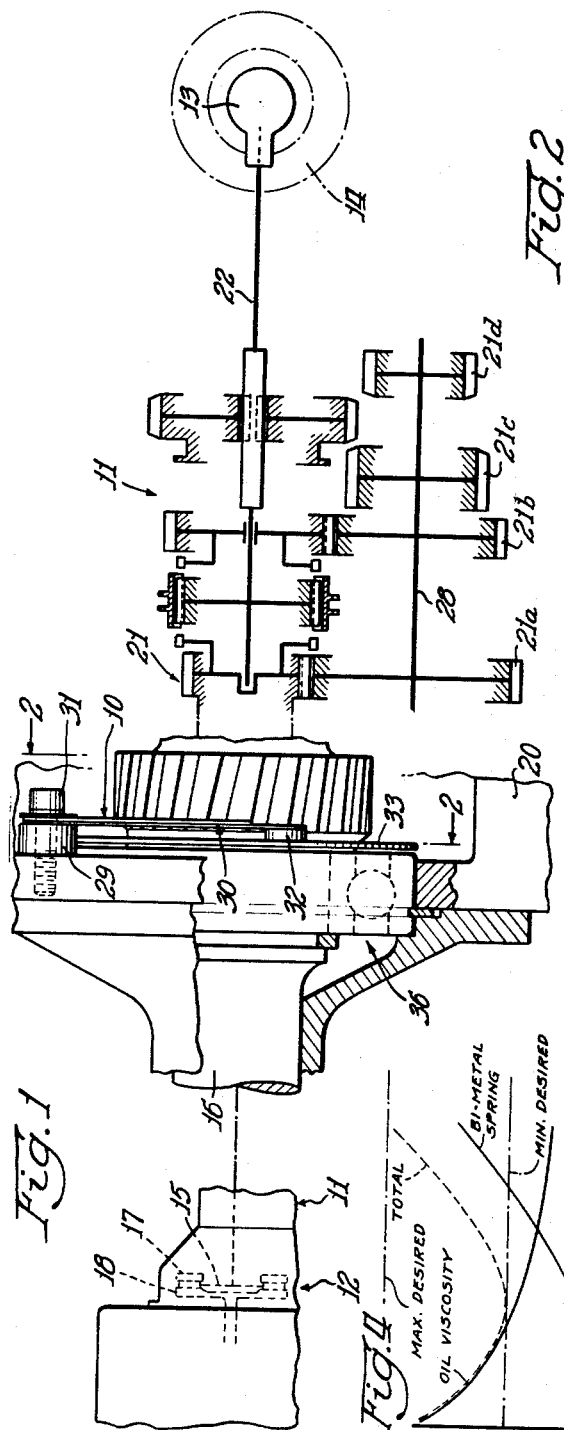
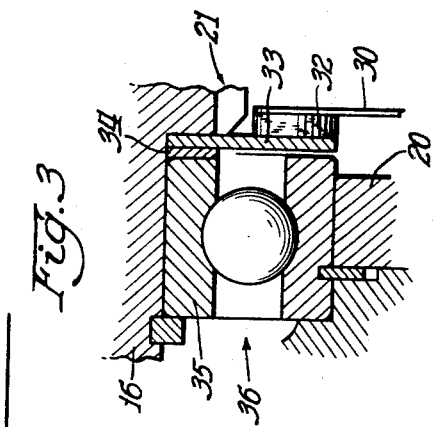
Inventor:
Richard L. Smirl
By: Joseph W. Malleck
Atty.

United States Patent Office 3,139,764
Patented July 7, 1964

3,139,764
ANTI-SPIN DEVICE FOR TRANSMISSION MECHANISM
Richard L. Smirl, La Grange Park, Ill., assignor to Borg-Warner Corporation, Chicago, Ill., a corporation of Illinois
Filed Mar. 21, 1961, Ser. No. 97,329
5 Claims. (Cl. 74—339)

This invention relates to transmissions and more particularly to a temperature-responsive frictional drag device employed in such transmissions adapted to exert a limited stopping torque on certain transmission members for inhibiting undesired free rotation of such members.

For cost reasons, most automotive countershaft transmissions do not have gear synchronization in first and reverse gear positions which would normally prevent "gear clash." Gear clash results when an automotive transmission is shifted into one of its unsynchronized gear ratio positions (usually low and reverse) while the transmission input shaft and its rotatively connected elements (i.e. other gearing) are rotating freely relative to the transmission output shaft and its rotatively connected eleemnts. Such free rotation may be obtained in several ways: the driver may shift to neutral while the vehicle is still in motion, the driver may engage the clutch with the transmission in neutral regardless of the motion of the vehicle, or the clutch driven plate of the accompanying clutch assembly may be unintentionally caused to slide into contact with the pressure plate during the intended disengaged condition of the clutch. Rotation of the input shaft and its rotatively connected elements may be considered "free," for purposes of this invention, when transmission oil is relatively hot and has a corresponding low viscosity. At relatively low oil temperatures the viscosity of the oil is normally sufficient to impede rotation and bring the input shaft and its rotatively connected elements to a quick stop.

It is, therefore, a primary object of this invention to provide a device that is effective to inhibit and stop free rotation of the transmission input shaft and its rotatively connected elements when the transmission oil temperature increases.

It is a more particular object to provide a temperature-responsive device adapted to be mounted within a transmission and be sensitive to a change in transmission oil temperature for exerting a limited stopping torque on the transmission input shaft and its normally rotatively connected elements for inhibiting free rotation thereof at relatively high oil temperatures.

It is another object to provide a unique drag means which co-operates with the transmission oil to provide a limited stopping torque for preventing unwanted free rotation of one or more transmission members, the drag means comprising a strip of bi-metallic material subjected to transmission oil which changes shape in response to changes in oil temperature to impart a frictional drag force on said one or more transmission members.

It is still another object to provide a novel drag means to inhibit free rotation of the transmission members which is adapted to apply an increasing drag force when transmission oil viscosity drops to a predetermined magnitude so that the primary force normally providing a limited stopping torque is gradually shifted from oil fluid drag to a mechanical dray means.

The invention consists of the novel constructions, arrangements, devices to be hereinafter described and claimed for carrying out the above stated objects and such other objects as will appear from the following description of a preferred form of the invention illustrated with reference to the accompanying drawings, wherein:

FIG. 1 is a fragmentary sectional and partially schematic view of a transmission mechanism in which the drag means of the present invention is disclosed;

FIG. 2 is a sectional view taken on line 2—2 of FIG. 1;

FIG. 3 is an enlarged framentary sectional view taken on line 3—3 of FIG. 2; and FIG. 4 is a graphical representation illustrating generally the function of the force of the drag means and oil viscosity with oil temperature.

Like characters of reference designate like parts in the several views.

Referring to FIG. 1, the drag means of the present invention is designated generally by the numeral 10 and is adapted for use with a transmission mechanism 11. The transmission 11 is constructed for use in a power train of an automotive vehicle in combination with a clutch 12 and a differential mechanism 13. The differential mechanism 13 is adapted to drive the road wheels 14 of the vehicle.

The clutch mechanism 12 comprises a friction disc 15 splined to an input shaft 16 of the transmission 11, a pressure plate 17 and a flywheel assembly 18. The flywheel assembly 18 is connected so as to be driven by the engine crank shaft and the pressure plate 17 is adapted to be moved axially for engaging the clutch disc 15 with the flywheel 18 for completing the power train into the transmission 11.

The transmission mechanism 11 comprises a casing 20 (shown cut away in FIG. 1), a plurality of gears 21, the input shaft 16 and an output shaft 22; the input and output shafts are interconnected by the gearing 21. The output shaft 22 is connected to the differential 13 for driving the rear wheels 14 of the vehicle.

In known transmissions which are not equipped with synchronizers, various elements of the gearing 21 may be subject to "gear clash" upon shifting. Such clash is due to free rotation of the input shaft 16 and its rotatively connected elements (gears 21a, 21b, 21c, and 21d mounted on the countershaft 28) when transmission oil is sufficiently elevated in temperature that drag due to oil viscosity has little effect. For purposes of this invention, "rotatively connected elements" is here used to refer to members mounted on the input and countershaft of the transmission which are subject to free spin and not to members mounted on the output shaft of the transmission.

To obviate the above conditions, a drag means 10 is provided comprising a drag leaf 30 constructed as an elongated strip or strips of bi-metallic material fixedly mounted at one end to a portion of the interior surface of the transmission casing 20 by means of a machine screw 31 threadably received in an opening therein. As shown in FIG. 1, the drag leaf 30 is preferably mounted so that the secured end is spaced from the casing surface by a bushing 29. The bi-metallic strip of drag leaf 30 has plys 30a and 30b of differential lengths which are adapted to co-operate in flexing in a direction normal to the plane of the leaf 30 in response to a change in temperature of the oil.

As best shown in FIG. 3, the drag leaf 30 carries a piece of cork or friction material 32 on the free end thereof which is adapted to form rubbing contact with a thrust washer 33. The frictional material 32 may alternatively be placed on the thrust washer 33 and formed as a ring integral therewith. In the preferred embodiment, the thrust washer 33 abuts against a second smaller washer 34 which, in turn, contacts one end of an inner race 35 of a support bearing 36 for the input shaft 16. A stepped washer may be used in place of the two differentially sized washers 33 and 34. As shown in FIG. 1, the drag leaf 30 extends generally normally to the axis of shaft 16 and is spaced from the thrust washer 33 by bushing 29.

The washer 34 disposed between the thrust washer 33 and the bearing 36 is of approximately the same diameter as the inner race 35 and serves to displace the washer 33 away from the outer race of the bearing 36. This insures that the drag torque developed by the drag leaf 30 is transmitted through the washer 33 and is transmitted to the input shaft 16.

The drag leaf 30 is arranged within the casing 20 so that the force exerted by it against the washer 33 increases with increasing oil temperature. A particular factor in the arrangement of the parts for providing application of a drag leaf force, is the radial distance of the contact point of the friction material 32 from the center of rotation of the shaft 16. This should be selected to provide an appropriate stopping torque which is pre-determined to co-operate with the viscosity of the transmission oil as graphically illustrated in FIG. 4. The graph illustrates generally a drag force "D," acting upon free spinning elements, plotted along the ordinate as a function of increasing temperature "$t$" plotted along the abscissa. At low oil temperatures, the resultant drag force acting upon the transmission elements, i.e. elements 16, 21a, 21b, 21c and 21d, to inhibit free rotation thereof, is due primarily to the oil viscosity. At such low oil temperatures, the drag leaf 30 may even lift the friction material 32 away from the thrust washer 33 and provide a complete separation therewith. As oil temperature increases and the oil is brought into contact with the drag leaf 30 by internal splashing of the transmission 21, the resultant drag force is soon aided by the locally exerted force of the leaf 30. The leaf 30 should be constructed and arranged to provide a gradual assist force (indicated by the curve labeled Bi-Metal Spring) to the oil viscosity drag so that the resultant force never drops below a predetermined minimum (as indicated by the line labeled Min. Desired).

In addition, the leaf 30 should be calibrated so that in cooperation with oil viscosity, the Total or combined viscous and mechanical drag does not exceed a Maximum Desired total drag above which tooth-butting of the gears to be meshed becomes objectionable. This maximum calibration provides an important advantage in that it permits use of a lighter grade transmission oil for year-round use; under known constructions, transmission oils are required to be of a grade which compromises between the conditions of tooth-butting with cold oil and gear spin with hot oil.

For purposes of explaining the preferred embodiment and not to limit the scope of the invention herein in any way, the drag leaf 30 has been constructed to exert a maximum torque of between 7 and 11 oz.-inches on the thrust washer 33 at room temperature (70° F.). The torque, therefore, exerted by the drag leaf is not so large to interfere with the normal operation of the transmission 11, but is sufficient to quickly stop free rotation of the transmission gearing 21.

The amount of torque possessed by the free spinning members which must be overcome will vary with the particular construction of the transmission. The drag means 10 therefore must necessarily be varied in size and arrangement to meet such requirements.

The condition of free spin of transmission members may most often be produced when the vehicle is coasting to a stop in high gear, whereby the clutch is disengaged and the transmission is then shifted into a neutral condition by the vehicle operator. Certain elements or gears of the transmission are slowed since they are drivingly connected to the road wheels 14 and the gradual decreasing speed of the automobile will in turn slow the rotation of such elements. To engage one of the gears which is drivingly connected to the road wheels with one of the gears which is rotatively connected to the input shaft, under the above conditions, would normally result in gear clash. The drag leaf 30 functions to exert a limited torque on the input shaft 16 and its rotatively connected elements for dampening free rotation.

Although the preferred embodiment has been illustrated with the drag means 30 adapted to engage the input shaft 16, it should be readily understood that other embodiments may be constructed which adapt the drag means 10 for engagement with any one of the elements rotatively connected with the input shaft 16.

There has been provided by this invention an improved temperature-responsive means effective to stop gear spin within a transmission mechanism of the sliding gear type and for preventing gear clash due to free spin of the transmission gearing when re-engaging the transmission into one of its unsynchronized gear ratio positions.

It is to be understood that the invention is not limited to the specific constructions and arrangements shown and described, except only insofar as the claims may be so limited, as it will be understood to those skilled in the art that changes may be made without departing from the principles of this invention.

What is claimed is:

1. In a transmission mechanism, the combination of: a casing containing transmission oil, an input shaft and an output shaft rotatively supported by said casing, gearing rotatively mounted within said casing subject to said transmission oil and interconnected with said input and output shafts, and a temperature responsive frictional drag device mounted within said casing subject to said transmission oil to which said gearing is subjected and at substantially the same temperature and effective to act upon one of said gearing or input shaft for exerting a limited stopping torque in response to a change in temperature of said transmission oil for inhibiting free spin of said gearing.

2. In a transmission mechanism, comprising: a casing containing transmission oil, countershaft gearing disposed within said casing, a rotatable shaft supported by said casing and connected to said gearing, and drag means comprising a strip of bi-metallic material mounted within said casing and responsive to transmission oil temperature change and effective to act on said rotatable shaft for exerting a frictional force thereon that increases with increase in oil temperature for thereby inhibiting free rotation of said gearing.

3. In a transmission mechanism having a casing and countershaft gearing disposed in said casing and an input and an output shaft interconnected by the gearing, the combination of a strip of bi-metallic material, means for fastening one end of said strip within said transmission casing where it can be responsive to transmission oil temperature changes, a friction facing carried by the other end of said strip, and a rotatable thrust element interconnected with said input shaft and adapted to be contacted by said friction facing, whereby said strip exerts a limited stopping force on said element that increases with increasing transmission oil temperatures.

4. In a transmission mechanism having an input and an output shaft, the combination comprising: a casing for containing lubrication oil; a transmission means interconnecting said input and output shafts for providing a power train therebetween and including a plurality of rotatable transmission members within said casing for providing a plurality of selective speed ratios; means for disconnecting one or more of said rotatable transmission members from said power train, said transmission members being subject to free rotation upon such disconnection when the transmission oil reaches relatively high temperatures; and mechanical drag means mounted within said casing being subject to changes in temperature of said transmission oil and adapted to engage at least one of said transmission members for inhibiting such rotation of said transmission members, said drag means being responsive to an oil temperature change to gradually supplement the normal drag of oil viscosity when oil temperature is low and the oil increases in temperature so that at higher oil temperatures the primary drag is that of the drag means upon said transmission members.

5. The combination of claim 4, in which said drag means comprises at least one strip of bi-metallic material having plys of differential length, said strip being adapted to flex in a direction normal to its plane of disposition in response to a change in temperature of said oil, said strip having a piece of frictional material at one end which is caused to be moved gradually against said transmission members as said temperature of the oil causes said strip to flex.

References Cited in the file of this patent

UNITED STATES PATENTS

| | | |
|---|---|---|
| 2,550,545 | Findley | Apr. 24, 1951 |
| 2,699,846 | Pitman et al. | Jan. 18, 1955 |